Figure 1:
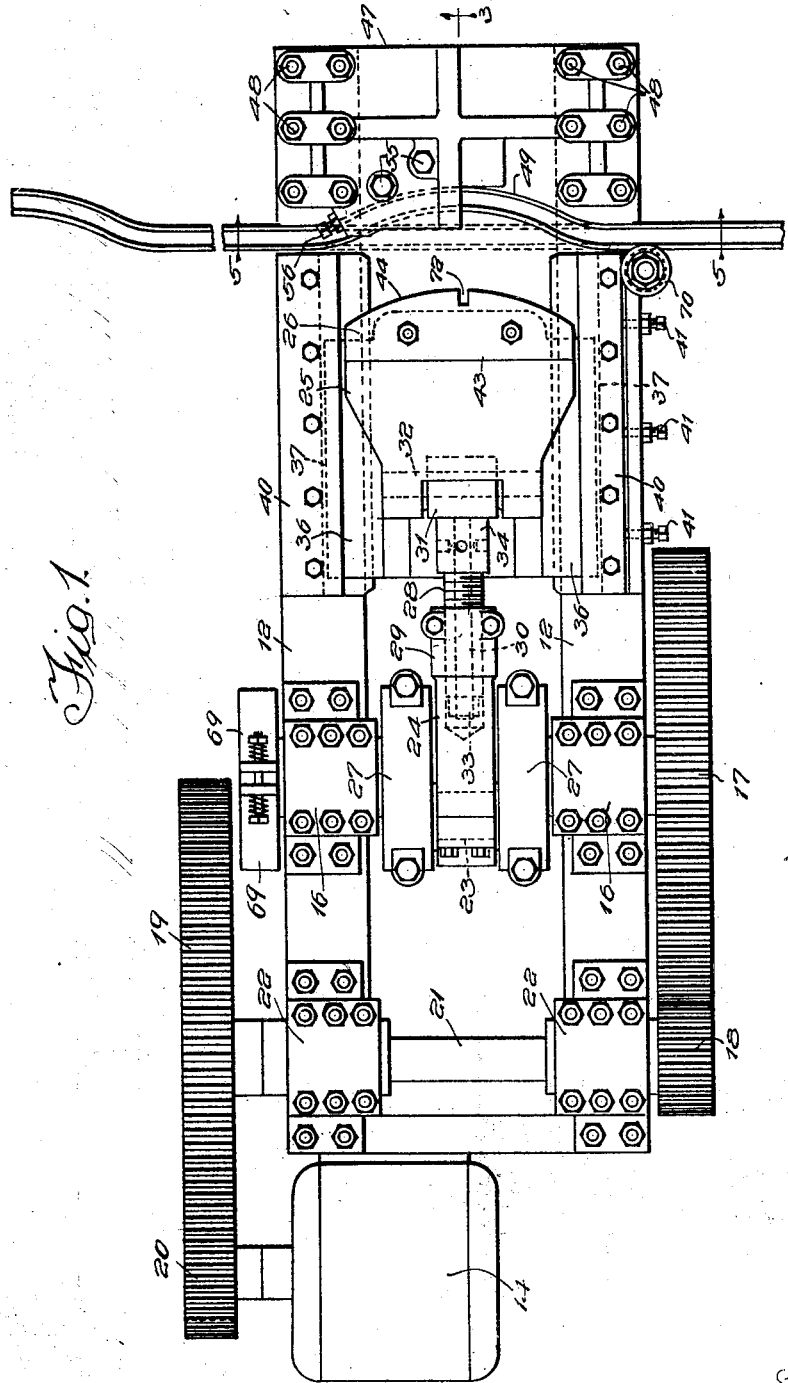

May 5, 1931.  W. J. BOYLE, JR  1,803,542
FORMING AND CUTTING MACHINE
Filed Sept. 8, 1927  6 Sheets-Sheet 1

Witness:
William P. Milroy

Inventor:
Willis J. Boyle Jr.
By George I. Haight

May 5, 1931. W. J. BOYLE, JR 1,803,542
FORMING AND CUTTING MACHINE
Filed Sept. 8, 1927    6 Sheets-Sheet 2

Witness:
William P. Kilroy

Inventor:
Willis J. Boyle Jr.
By George I. Haight
His Atty.

May 5, 1931.  W. J. BOYLE, JR  1,803,542
FORMING AND CUTTING MACHINE
Filed Sept. 8, 1927  6 Sheets-Sheet 6

Witness:
William P. Kilroy

Inventor:
Willis J. Boyle Jr.
By George J. Haight

Patented May 5, 1931

1,803,542

UNITED STATES PATENT OFFICE

WILLIS J. BOYLE, JR., OF LOS ANGELES, CALIFORNIA, ASSIGNOR TO THE BOYLE MANUFACTURING COMPANY, INC., OF LOS ANGELES, CALIFORNIA, A CORPORATION OF CALIFORNIA

FORMING AND CUTTING MACHINE

Application filed September 8, 1927. Serial No. 218,288.

This invention relates to improvements in forming and cutting machines employed in the manufacture of rolling hoops and chime sections employed on steel drums.

In the manufacture of rolling hoops and chime sections, it has been the general practice to form the bars or beams from which the hoops or chimes are made to a circle or ring like form by passing the bar between the usual set of three bending rolls. A difficulty encountered in this procedure is that the entire bar or beam is not bent to a true circle by the forming rolls, the leading end as well as the end last to leave the bending rolls remaining substantially straight for an appreciable distance, which requires separate bending and forming of the ends to true circular form subsequent to the main bending operation. This is especially true of heavy bars of I-beam or other cross section, as the forming rolls must be spaced apart a considerable distance to accommodate the relatively thick beam or bars therebetween. After the main body portion of the bar or beam has been formed to circular shape, it is extremely difficult to form the ends to circular shape without distorting the remainder of the ring like bar or beam. In fact, it is found difficult to form the ends to true circular form and much labor is required to perform this operation, thus adding greatly to the cost of manufacture.

It is the main object of my invention to overcome the difficulties pointed out by providing a bending machine for preparing the ends of the bars or beams for the curving operation between the forming rolls, so that the bar or beam will have true circular form throughout when it leaves the forming rolls.

Another object of my invention is to provide a forming machine for bending the opposite ends of the bars or beams from which the rolling hoops or chime rings are formed to true circular form prior to the operation of bending the entire bar to a ring like shape.

A further object of the invention is to provide a machine employed in the manufacture of rolling hoops and chime rings, for bending a continuous bar at predetermined spaced sections to curved form, leaving the remainder of the bar substantially straight and severing the bar at a point between the ends of each curved section to provide lengths having curved ends which conform to the true circular contour of the rolling hoops or chime rings to be manufactured.

A more specific object of the invention is to provide a combined forming and cutting machine for bars or beams, including curved, cooperating bending dies for curving sections of the bars or beams and cooperating cutting or shearing beams for severing the bars or beams midway of each curved section thereof to provide predetermined lengths having curved opposite ends and substantially straight intermediate portions.

A still further object of the invention is to provide a combined bending and cutting machine of the character indicated, including a fixed, curved forming die and a movable, curved forming die between which a length of bar or beam is bent and shearing means for severing the bar or beam midway of the bent section, the forming and shearing means being operated in sequence.

Yet another object of the invention is to provide a bending machine including a fixed and a reciprocating bending die for curving a portion of said bar and relatively movable shearing blades operating centrally of the bending dies to sever the curved portion midway of its length.

Other objects of the invention will more clearly appear from the description and claims hereinafter following.

Figure 2:
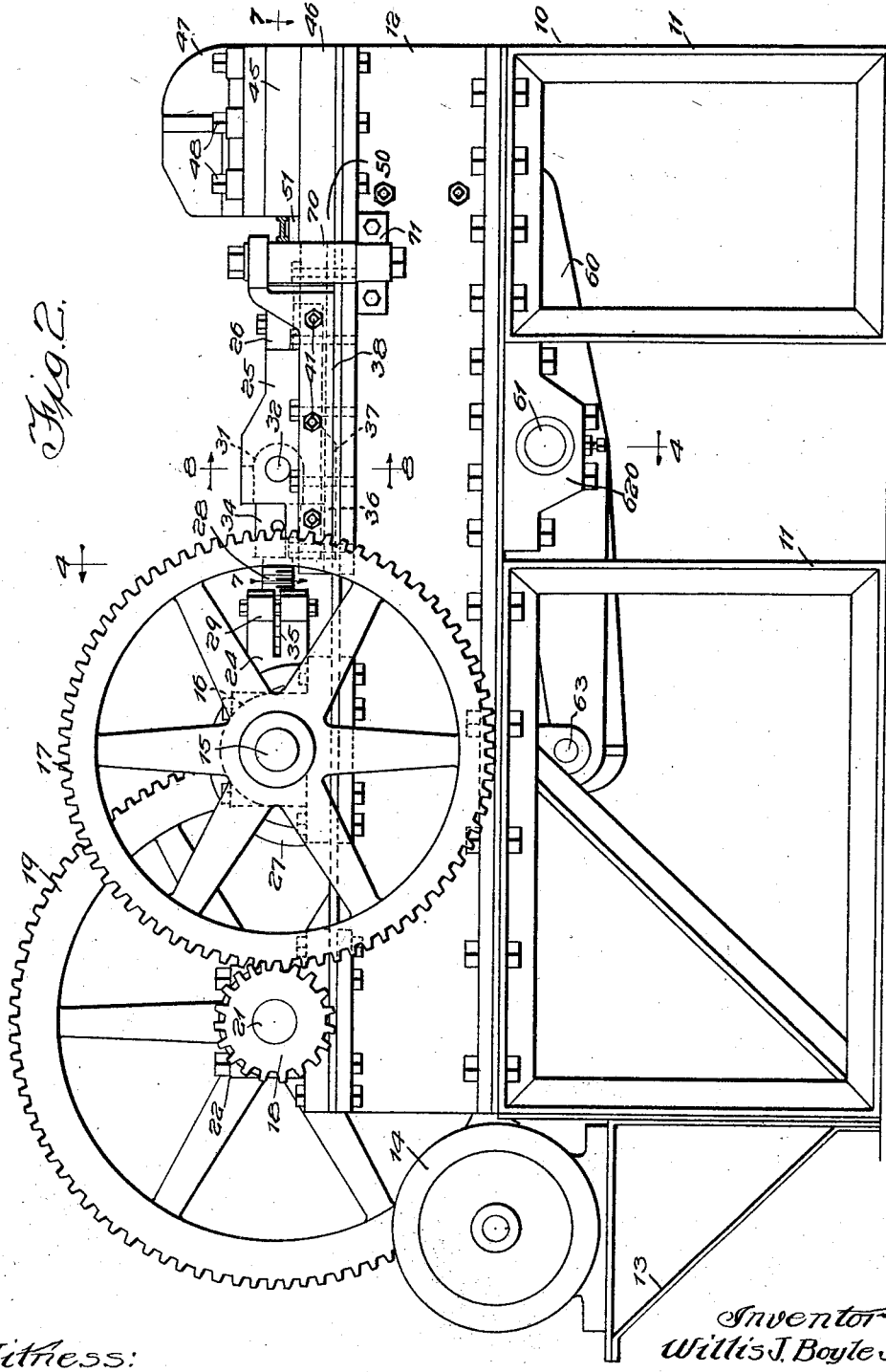
Figure 3:
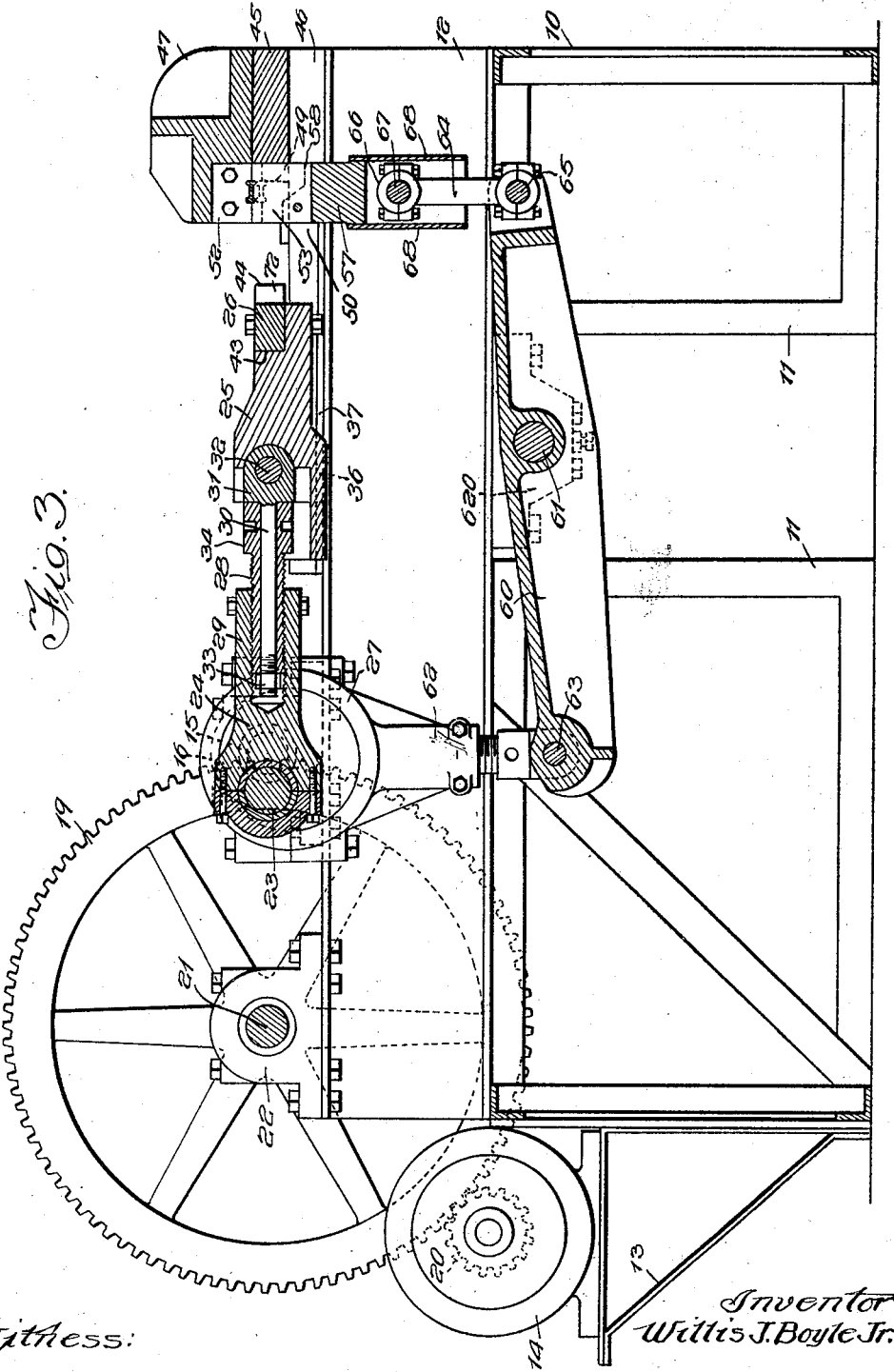
Figure 4:
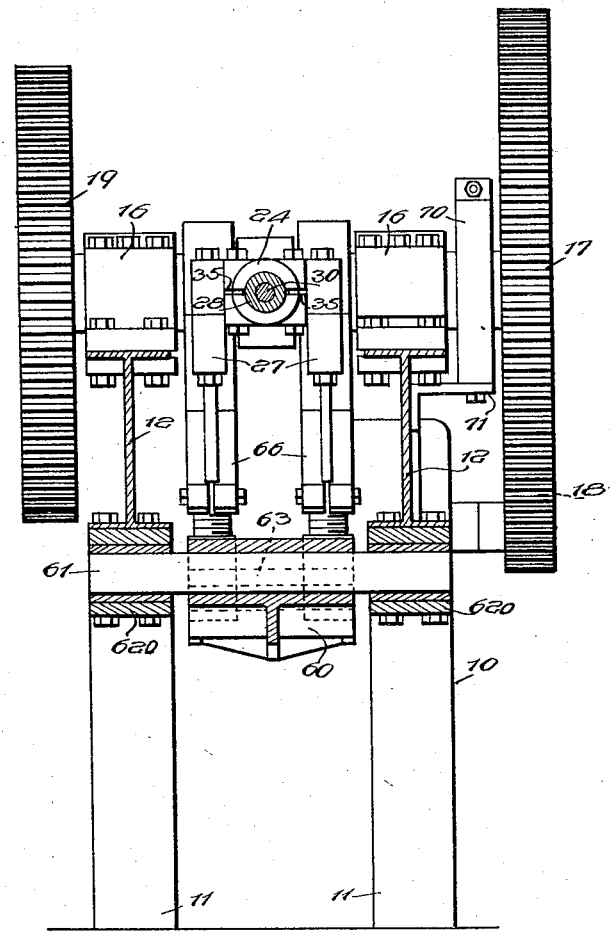
Figure 5:
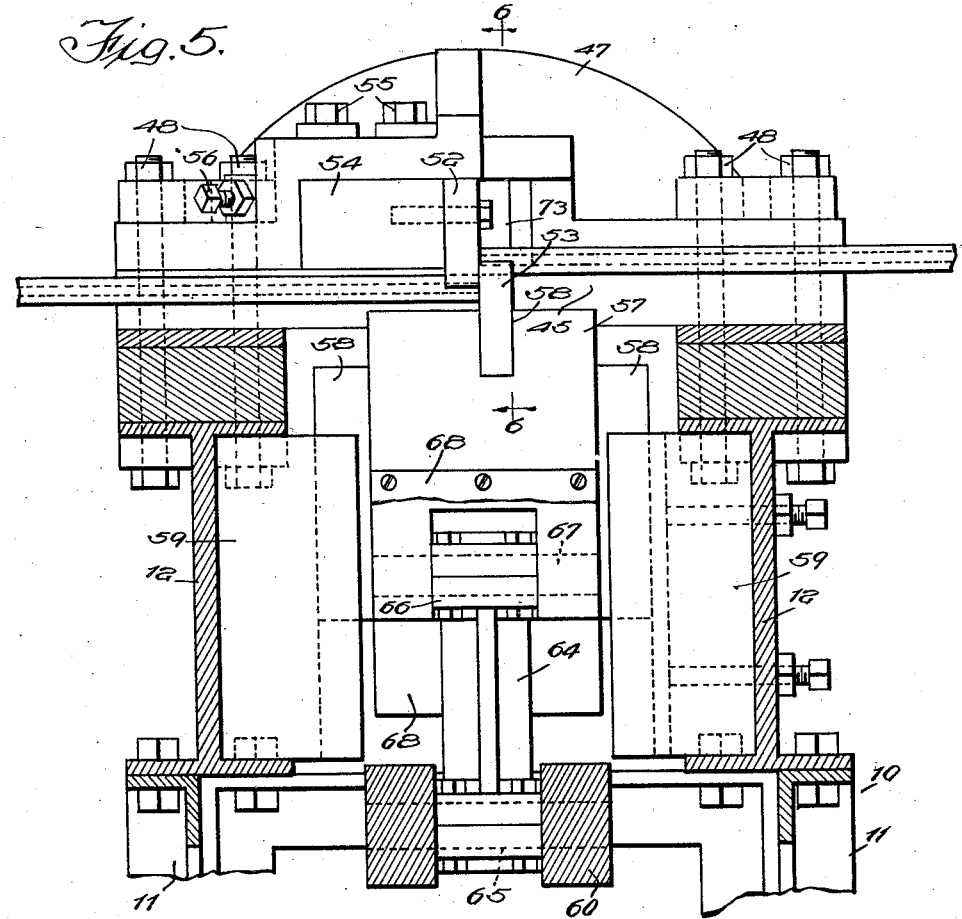
Figure 6:
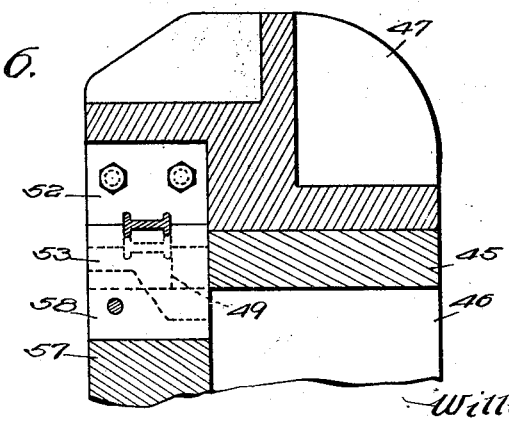
Figure 7:
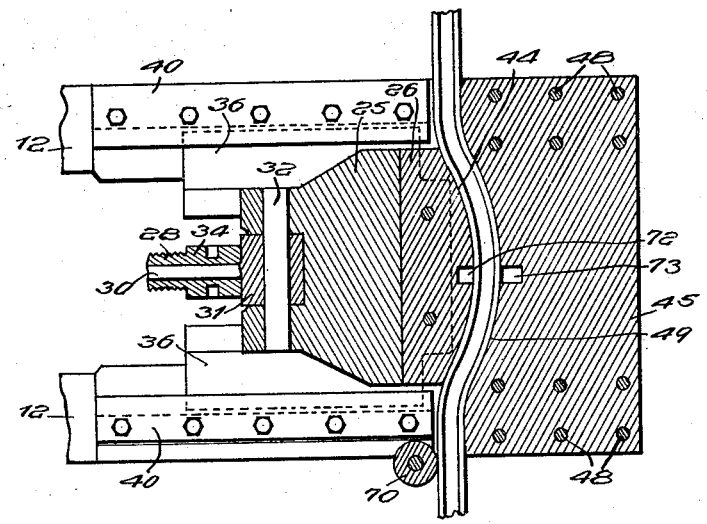
Figure 8:
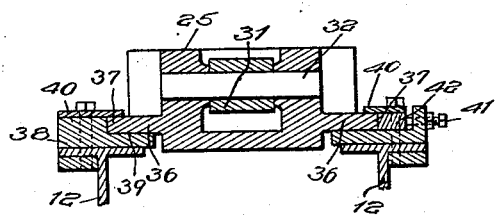
Figure 9:
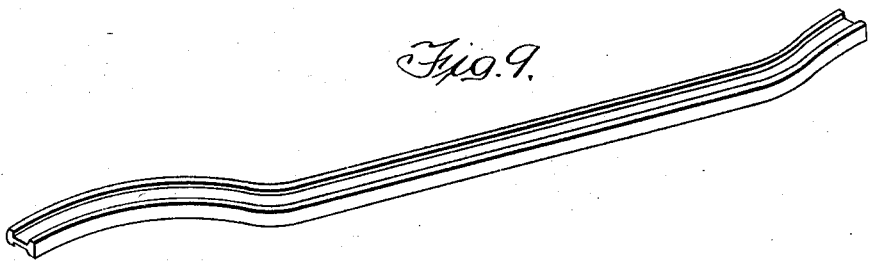

In the drawings, forming a part of this specification, Figure 1 is a horizontal, plan view of my improved machine. Figure 2 is a side elevational view of the machine illustrated in Figure 1. Figure 3 is a vertical, longitudinal sectional view corresponding substantially to the line 3—3 of Figure 1. Figure 4 is a vertical, transverse sectional view corresponding substantially to the line 4—4 of Figure 2. Figure 5 is a vertical, transverse sectional view corresponding substantially to the line 5—5 of Figure 1, the view being on an enlarged scale and illustrating the forming and shearing dies, the shearing dies being illustrated as having severed the bar. Figure 6 is a vertical sectional view corresponding substantially to the line 6—6 of Figure 5. Figure 7 is a horizontal, sectional view corresponding substantially to the line 7—7 of Figure 2, the view being on an enlarged scale and illustrating in detail the forming or bending dies. Figure 8 is a transverse, vertical sectional view corresponding substantially to the line 8—8 of Figure 2, illustrating the manner of mounting and guiding the reciprocating bending or forming die of my improved mechanism. And Figure 9 is a detail, perspective view of the article produced by my improved machine.

In said drawings, 10 designates the frame work or base of my improved machine, the frame work or base comprising rectangular frame sections 11—11 preferably formed of angle bars, the frame members or sections 11 supporting longitudinally extending heavy I-beam members 12, there being two of such I-beam members arranged in spaced relation as most clearly illustrated in Figure 4. Each of the I-beam members 12 is supported by two rectangular frame sections 11, the frame sections forming the supporting legs or feet of the machine. At the left hand end of the machine frame, as shown in Figures 1 and 2, a bracket support 13 is provided on which a driving motor 14 of well known form is mounted. The frame I-beam members 12 directly support the forming and shearing mechanism of the machine and also the driving gearing therefor.

A main operating crank shaft 15 is supported on top of the I-beam members 12, being journalled in bearing blocks 16 bolted to the I-beam sections 12, as most clearly shown in Figures 1, 2, 3 and 4. The crank shaft 15 has a gear 17 of relatively large diameter mounted at one end thereof, the gear 17 being driven by a train of gears 18, 19 and 20 from the motor 14. The gear 18 meshes directly with the gear 17 and is mounted on a transverse shaft 21 journalled in bearing members 22—22 secured to the side frame I-beam members 12. At the end opposite the gear 18 the shaft 21 carries the relatively large gear 19 meshing with the gear 20 mounted on the motor drive shaft. As will be evident the train of gearing 17, 18, 19 and 20 serves as a power multiplying means and reducing gearing. As will be evident the crank shaft 15 is operated at a much slower speed than the drive shaft of the motor 14. The crank shaft 15 is provided with a central crank portion 23 on which a connecting rod 24 is journalled. The end of the connecting rod 24 remote from the crank of the crank shaft is connected to a reciprocating cross hand member 25 which carries a movable bending die 26. On opposite sides of the crank member proper 23 of the crank shaft, the latter carries eccentric members 27—27 which serve to drive the shearing mechanism of my improved machine as hereinafter more clearly pointed out. The connecting rod 24 is preferably made adjustable in length so that the position of the movable bending die 26 with respect to the fixed bending die of the machine may be accurately determined. The adjusting means for the connecting rod comprises a screw threaded sleeve member 28 having external threads engaging interior threads on the head portion 29 of the connecting rod. The sleeve 28 is rotatably mounted on a headed bar or bolt like member 30 having the head 31 thereof provided with a transverse opening receiving a relatively short stub shaft 32 fixed to the cross head 25. The bolt or bar 30 is thus journalled on the cross head 25. The bolt section 30 is provided with a threaded outer end receiving nut 33 by means of which the rotatable sleeve 28 is held on the bolt like section. As will be evident when it is desired to either lengthen or shorten the connecting rod 24, the sleeve 28 is rotated in the proper direction to feed the sleeve outwardly or inwardly, the sleeve 28 being provided with an enlarged section 34 provided with the usual spanner wrench receiver openings for adjusting the same. In order to hold the parts in fixed relation when adjusted, the member 29 of the connecting rod is longitudinally slotted, as indicated at 35, clamping bolts of the usual type being provided to draw the split section of the member 29 together.

The cross head 25 as most clearly shown in Figure 8 is in the form of a relatively heavy block having laterally extending horizontal guide flanges 36—36 on the opposite sides. The guide flanges 36 are mounted to slide in guideways 37—37 provided at the opposite sides of the machine frame. As most clearly illustrated in Figure 8 the guideways are formed by longitudinally disposed bars 38 cut away at the inner sides thereof, as indicated at 39, the cut away portions 39 receiving the flanges 36. The flanges 36 are held within the guideways by cover plates 40 overhanging the guideways and engaging the upper faces or surfaces of the flanges 36, the plates 40 being preferably detachably mounted and bolted to the bars 38, the bolts also extending through the top flanges of the I-beam side members 12 to secure these members to the frame of the machine. In order to provide for adjustment of the guide means for the cross head 25, and also to take up for wear, one of the guides is preferably constructed of relatively adjustable sections. The right hand guide as shown in Figure 8 is adjustable in this manner, the block or bar 38 having the upstanding portion thereof provided with set screws 41 co-operating with an adjustable bar member on which the plate 40 is mounted, the plate 40 and the bar 42 being slotted to accommodate the bolts by which the guide member is held to the frame.

The cross head 25 carries the curved bending or forming die 26 at the upper side thereof, the cross head being cut away as indicated at 43 to receive the bending die. The bending die is in the form of a relatively heavy transversely elongated block having a convex outer bending surface or face 44. The bending die 26 is preferably bolted to the cross head as clearly shown in Figures 1, 2 and 3.

The fixed forming die of my improved machine is disposed opposite the movable die 26 and is designated by 45. As shown, the fixed forming die 45 is in the form of a relatively heavy block mounted on a supporting block 46 which is in turn supported on the top flanges of the I-beam members 12 of the frame of the machine. The fixed forming die 45 is clamped between a top bracket member 47 and the block 46, the parts being held on the frame of the machine by a plurality of bolts 48—48 extending through the bracket 47, die block 45 and supporting block 46 and also through the top flanges of the I-beam side frame members 12. The fixed forming or bending die 45 is provided with a concave bending surface 49 corresponding in curvature to the convex bending surface 44 of the movable bending die 26 so that when the dies are brought into operative bending relation a bar interposed between the same will be given a predetermined curvature of true circular form. As most clearly illustrated in Figure 2, the supporting block 46 has the central portion on the inner side thereof cut away to correspond with the bending surface of the bending die 45 and has inwardly projecting extensions 50, 50 at the opposite sides of the bending die on which supporting plates 51—51 are mounted, which serve as spaced supports for the bar or beam operated upon by the bending dies.

The shearing means of my improved machine comprises a fixed shearing member 52 and a movable shearing member 53. The fixed shearing member 52 is secured to the supporting bracket 47 and is disposed in such position that the bar or beam operated upon will be sheared midway of the section bent by the bending dies. The fixed cutting or shearing member comprises a blade 52 secured to a block 54 adjustably mounted on the supporting bracket 47, the block 54 being held to the bracket 47 by cap screws or bolt members 55 which permit of slight adjustment, the openings in the bracket 47 through which the members 55 extend being elongated to provide for this adjustment. As most clearly illustrated in Figures 1 and 5, a set screw 56 is provided in the bracket 47 engaging the end face of the block 54 so as to determine the adjustment of this block and the fixed cutting or shearing blade 52.

The movable cutting or shearing blade 53 is disposed below the blade 52 and is mounted in a reciprocating cross head block 57. As shown in Figure 5 the block 57 is slotted longitudinally at the upper side thereof as indicated at 58 to accommodate the cutting blade 53. The blade 53 may be bolted or otherwise fixed to the block 57. The block 57 is provided with wing like guide members 58 at the opposite sides thereof working in guide members 59 fixed to the side frame sections or beams 12 of the machine in any suitable manner. The connection between the cross head 57 and the guides 58 may be of any well known form, the guide blocks or frame members 59 being herein illustrated as slotted to receive the guide wings 58. The cross head 57 is reciprocated at timed intervals in proper sequence with the operation of the bending mechanism by means directly operated from the driving crank shaft 15. The operating means for the cross head 57 includes a walking beam 60 pivoted on a transverse shaft 61 journalled in bearings 620—620 secured to the bottom flanges of the side frame I-beam members 12. One end of the walking beam member 60 is connected to a pair of eccentric rods 62—62 which cooperate with the eccentrics 27—27 at opposite sides of the crank member proper of the crank shaft 15. The eccentric connections or rods 62 are of well known form and include the usual eccentric straps which engage about the eccentrics 27. The eccentric rods 62 are pivotally connected to the walking beam 60 by a transverse pin or stub shaft 63. The length of the eccentric rods is also preferably made adjustable, the means for adjusting the same being substantially identical with that employed in connection with the connecting rod of the crank shaft.

The end of the walking beam 60 opposite to that which is connected to the eccentrics, is connected to the reciprocating cross head 57 by a connecting rod 64, the lower end of the connecting rod 64 being journalled on a transverse pin 65 extending transversely through the end of the walking beam 60, this end of the walking beam being slotted, as clearly shown in Figure 3, to receive the lower end of the connecting rod 64. As most clearly shown in Figure 5, the cross head block 57 is slotted as indicated at 66 to receive the upper end of the connecting rod 64, this end of the connecting rod being journalled on a transverse pin 67 having its opposite ends fixed in the cross head 57. In order to protect the journal member at the upper end of the connecting rod from dirt and other foreign matter, the opening in the cross-head 57 is closed at the opposite sides by detachable cover plates 68—68.

As most clearly shown in Figures 3 and 6, the shearing edges of the cooperating cutting or shearing blades 52 and 53 are of a shape to correspond with the beam to be operated. In the present instance I have shown the machine designed for operating on bars or beams of I-beam cross section and the edges of the shearing blades are notched to correspond to the formation of the I-beam member thus assuring the complete and proper shearing of the I-beam member during the cutting operation.

Upon reference to Figure 3, it will be seen that the eccentrics 27 are so disposed with reference to the crank portion of the crank shaft 15 that the reciprocating cutting or shearing die 53 will be operated after the bending operation has been completed and the movable bending die 26 has been moved away from the fixed bending die 45.

My improved machine may be operated either continuously or intermittently, that is, the same may be driven continuously by the motor 14 or the power of the motor may be cut off at desired intervals after each bending and shearing operation to stop the machine. It is also obvious that clutch mechanism may be employed between the motor and the driving gearing of my machine to intermittently operate the same. As the moving parts of the machine have a certain amount of momentum during the operation thereof, it is essential that some means be employed to prevent overthrow of the parts when the clutch mechanism is thrown out or the motor is stopped. To prevent this overthrow of the parts, I provide the usual friction brake which is herein shown as cooperating with the crank shaft 15 directly. The friction brake comprises the usual friction disc secured to the crank shaft 15 and brake straps 69—69 joined by an adjustable clamping bolt, the usual springs being interposed between the flanges of the straps 69 and the head and nut of the bolt, respectively.

In the operation of my improved machine a length of I-beam section is inserted between the movable forming die 26 and the fixed forming die 45 of the machine, the beam being supported by the plates 51 at the opposite sides of the bending or forming dies. In order to facilitate the insertion of the length of I-beam, an anti-friction whipper roll 70 is employed at one side of the frame of the machine, the whipper roll being mounted on a bracket 71 secured to the corresponding side frame I-beam member 12. After the beam has been placed between the bending dies, the operating mechanism of the machine is thrown in and the die 26 moved toward the die 45, bending the section of the I-beam disposed between these dies. During the bending operation just described, the remainder of the I-beam member is maintained substantially straight by the straight abutment surfaces provided at opposite sides of the bending die and the inner ends of the blocks 38 and plates 40 forming the guides for the cross head 25. This arrangement is clearly illustrated in Figure 1. As the operation of the machine continues, the bending die 26 will be withdrawn from the bending die 45. Inasmuch as the walking beam 60 is operated directly from the eccentrics 27 on the crank shaft 15, the walking beam will be oscillated during the reciprocation of the die 26. The parts are so timed that the end of the walking beam 60 which is connected to the eccentrics will be in raised position when bending dies are operating. The cutting blades will thus be widely separated during the bending operation to accommodate the movable bending die therebetween. As the movable bending die recedes, the end of the walking beam 60 connected to the eccentrics will be depressed, thereby moving the cross head 57 which carries the movable cutting or shearing die 53 upwardly and bringing the cutting die 53 into operative relation with the fixed cutting die 52. As it is desirable to perform the shearing operation immediately after the bending operation, when the bending dies begin to separate, and before the movable bending die has been withdrawn to an extent to clear the movable cutting blade 53, the outer side of the die 26 is slotted as indicated at 72. As shown in Figure 7 the fixed bending die 45 is also slotted as indicated at 73 to accommodate the movable cutting plate 53. It will be evident that the I-beam section will thus be sheared midway of the curved portion thereof. The operation and position of the cutting or shearing dies will be clear upon reference to Figures 5 and 6 which show the parts in the position assumed at the end of the shearing operation. During the further rotation of the crank shaft 15, the cutting or shearing dies will be separated, thereby permitting removal of the severed section of the I-beam.

In operating on a continuous length of I-beam section to be employed in connection with rolling hoops and chime rings, the extremity of the continuous section is inserted between the bending dies of my machine and the bend formed therein adjacent said end, the bent portion being cut off midway to its length, thereby leaving a curved end on the continuous I-beam which corresponds to the curvature of the rolling hoop or chime ring to be formed. The bar or I-beam section is then advanced through the machine and a second section curved between the bending dies, and the curved section sheared midway of its length. After the operation last described, a complete bar or beam is produced having its opposite ends curved to correspond to the curvature of the finished rolling hoop or chime ring. It will be evident that the remainder of the continuous I-beam section is also provided with a curved end by the last named operation. The operations just described are then repeated until the continuous length of I-beam section has been cut or severed into a plurality of shorter lengths from which the rolling hoops or chime rings are formed. The completed length of I-beam section from which the rolling hoops or chime rings are formed is clearly shown in Figure 9 of the drawings. In completing the rolling hoop or chime ring, the section shown in Figure 9 is fed between the usual forming rolls arranged in triangular relation. In passing the bar or beam shown in Figure 9 through the forming rolls referred to the entire section is curved to the ring form of the finished rolling hoop or chime ring. As will be evident, a distinct advantage is obtained by initially curving the opposite ends of the beam inasmuch as this assures a corresponding true curvature throughout the entire section, when formed into a ring, so that the extremities will abut and may be welded together in the usual manner.

The sequence of operations performed by my improved machine is highly important in that the severing of the bent portion of the I-beam section after performing the bending operation assures flat, true abutment faces at the ends of the beam. This true formation of the end faces of the bar or beam is not possible where the severing or cutting operation is performed before the bending operation because in bending curved sections between forming dies, the dies will mar or upset the extremities of the bar. It is also pointed out that when a heavy chime ring beam is curved by a set of three forming rolls, the rolls must be spaced apart an appreciable distance to accommodate the bar therebetween. Due to the wide spacing between the rolls, the leading end of the bar as well as the end that leaves the rolls last is left substantially straight and must be formed to a curve after the major portion of the beam or bar has been curved. This requires additional labor and expense and extreme difficulty is had in forming the ends for true curvature and the further difficulty exists that the major portion of the beam which has been curved by the rolls is likely to become distorted, thus necessitating the reforming of this portion of the beam. From the preceding description taken into connection with the drawings, it will be evident that I have provided an exceedingly simple and efficient machine which produces uniform lengths of I-beam sections having the opposite ends thereof prepared for the curving operation performed by the usual bending rolls for producing chime rings and rolling hoops.

While I have herein shown and described what I now consider the preferred manner of carrying out my invention, the same is merely illustrative and I contemplate all changes and modifications that come within the scope of the claims appended hereto.

I claim:

1. A combined bending and cutting machine, including cooperating bending dies for bending an arcuate section of predetermined radius in an article operated upon, cooperating shearing dies for severing the arcuate section midway of the length thereof; and common means for actuating said bending and shearing dies in timed relation to cut said arcuate section after the bending operation is completed.

2. A combined bending and cutting machine, including means for bending an arcuate section of predetermined radius into an article operated upon; shearing means for cutting through the arcuate section; and means for operating said bending and shearing means in timed relation, whereby said section is cut after the bending operation is complete.

3. In a combined bending and cutting machine, the combination with cooperating bending dies having bending faces corresponding in curvature to an arc of predetermined radius; of a pair of cooperating shearing blades having mechanism associated therewith to effect operation of said blades midway of the length of the curved faces of the bending dies when the bending operation is completed.

4. In a combined bending and cutting machine, the combination with abutment means for holding a bar, said means being provided with straight faces; of bending dies operating between said abutment means and having engaging faces curved for bending on arcs of predetermined radius the section of the bar disposed between said abutment means; and shearing means operating midway between said abutment means to sever the bar midway of the arcuate portion to provide portions of two blanks each having a curved end of predetermined radius.

5. In a combined bending and cutting machine, the combination with a fixed bending die having a concave bending surface; of a movable bending die having a cooperating convex surface; means for reciprocating said movable bending die toward said fixed bending die; a fixed shearing blade disposed above the fixed bending die and substantially centrally thereof; a movable shearing blade cooperating with said fixed blade; means for reciprocating said movable shearing blade; and means for operating the reciprocating means for the movable bending die and the movable shearing blade in succession.

6. In a combined bending and cutting machine, the combination with a fixed bending die having an elongated curved bending face; of a movable bending die cooperating with said fixed die, said movable die having a cooperating curved bending face; and shearing means operating midway of the length of said curved bending face of the fixed die, said shearing means including a set of cooperating shearing blades, one of said blades being movable toward the other transversely of the path of movement of the movable bending die.

7. In a combined bending and cutting machine, the combination with means for curving a section of a bar while leaving the remainder of the bar substantially straight, said means being movable in one plane; of means for severing the bar between the ends of said curved section by movement along a plane disposed at an angle to said first plane.

8. In a combined bending and cutting machine, the combination with a base of a fixed bending die mounted on said base; a reciprocating bending die slidable on said base, said dies having curved cooperating bending faces; operating means for reciprocating said slidable bending die; a fixed shearing blade supported on said base above the fixed bending die; a reciprocating cutting blade cooperating with said fixed cutting blade; cooperating means for reciprocating said movable cutting blade; and means for driving said first and second named operating means in timed relation to operate said reciprocating bending die in advance of the reciprocating shearing blade.

9. In a combined bending and cutting machine, the combination with a support; of a bending die fixed to said support; a movable bending die slidable on said support, said dies having cooperating curved bending faces; a fixed shearing blade on said support above the fixed bending die; a shearing blade movably mounted on said support and cooperating with the fixed shearing blade; operating means for reciprocating said movable bending die and movable shearing blade, said operating means including a rotary drive shaft having a crank connection for operating the bending die and having eccentric connections for operating the reciprocating shearing blade.

10. In a combined bending and cutting machine, the combination with a fixed bending die having a concave bending surface; of a movable bending die having a convex surface; means for reciprocating said movable bending die toward said fixed bending die; means for adjusting the stroke of said last named means; a fixed shearing blade disposed above the fixed bending die and substantially centrally thereof; a movable shearing blade cooperating with said fixed blade; means for reciprocating said movable shearing blade; means for adjusting the stroke of said last named means; and means for operating the reciprocating means for the movable bending die and the reciprocating means for the movable shearing blade in succession.

11. A combined bending and cutting machine adapted to operate upon bar material and comprising a set of cooperating bending dies having arcuate forming surfaces for curving and gripping a length of the bar material along an arc of predetermined radius; and means for cutting through the bar material intermediate the ends of the curved length so formed while said material is gripped by said dies on both sides of the cut to simultaneously produce a plurality of sections each having an end portion of predetermined radius.

12. A machine for manufacturing blanks for rolling hoops of predetermined size from an elongated bar, including cooperating forming dies having faces shaped to form a section of said bar along an arc corresponding to the curvature of a completed rolling hoop; and means for severing the bar by cutting through said curved section to simultaneously provide a plurality of sections, each having an end portion corresponding to the curvature of a rolling hoop of said predetermined size.

13. A machine for bending and cutting bar material for producing circular members of predetermined diameter and including cooperating dies provided with cooperating arcuate faces, the radii of which correspond to that of a completed circular member, said dies being adapted to form said bar in a correspondingly curved section; and means for severing the bar material intermediate the ends of the curved section to provide blanks having curved end portions corresponding in radii to said complete circular member.

In witness that I claim the foregoing I have hereunto subscribed my name this 13th day of August, 1927.

WILLIS J. BOYLE, Jr.